United States Patent [19]

Kushibe et al.

[11] Patent Number: 5,016,598
[45] Date of Patent: May 21, 1991

[54] FUEL INJECTION CONTROL APPARATUS OF TWO-STROKE ENGINE

[75] Inventors: Takahiro Kushibe; Yuuichi Takano; Takeshi Sato, all of Susono, Japan

[73] Assignee: Toyota Jidosha Kabushiki Kaisha, Aichi, Japan

[21] Appl. No.: 585,676

[22] Filed: Sep. 20, 1990

[30] Foreign Application Priority Data

Sep. 29, 1989 [JP] Japan ............................. 1-113555[U]

[51] Int. Cl.$^5$ ............................................ F02M 67/02
[52] U.S. Cl. ................................. 123/533; 123/179 L
[58] Field of Search .................... 123/179 L, 531, 532, 123/533, 534

[56] References Cited

U.S. PATENT DOCUMENTS

| | | | |
|---|---|---|---|
| 4,674,462 | 6/1987 | Koch et al. | 123/533 |
| 4,771,754 | 9/1988 | Reinke | 123/533 |
| 4,781,164 | 11/1988 | Seeber et al. | 123/533 |
| 4,800,862 | 1/1989 | McKay et al. | 123/531 |
| 4,823,756 | 4/1989 | Ziejewski et al. | 123/531 |
| 4,936,279 | 6/1990 | Ragg | 123/533 |
| 4,962,745 | 10/1990 | Ohno et al. | 123/533 |

FOREIGN PATENT DOCUMENTS 2222435 3/1990 United Kingdom ................ 123/531
WO88/08082 10/1988 World Int. Prop. O. .

Primary Examiner—Willis R. Wolfe
Attorney, Agent, or Firm—Oliff & Berridge

[57] ABSTRACT

A fuel injection control apparatus provided with an air blast valve having a nozzle opening connected to an engine-drive air pump through a compressed air passage, a fuel injector for injecting fuel in the compressed air passage, and an opening and closing valve for controlling the opening and closing of the nozzle opening. When the compressed air pressure in the compressed air passage is lower than a set pressure, fuel is injected from the fuel injector during the opening of the opening and closing valve and the injected fuel is ejected from the nozzle opening by inertia force. When the compressed air pressure in the compressed air passage is above a set pressure, the fuel is injected from the fuel injector during the closing of the opening and closing valve and the injected fuel is ejected from the nozzle opening by compressed air during the opening of the opening and closing valve.

16 Claims, 6 Drawing Sheets

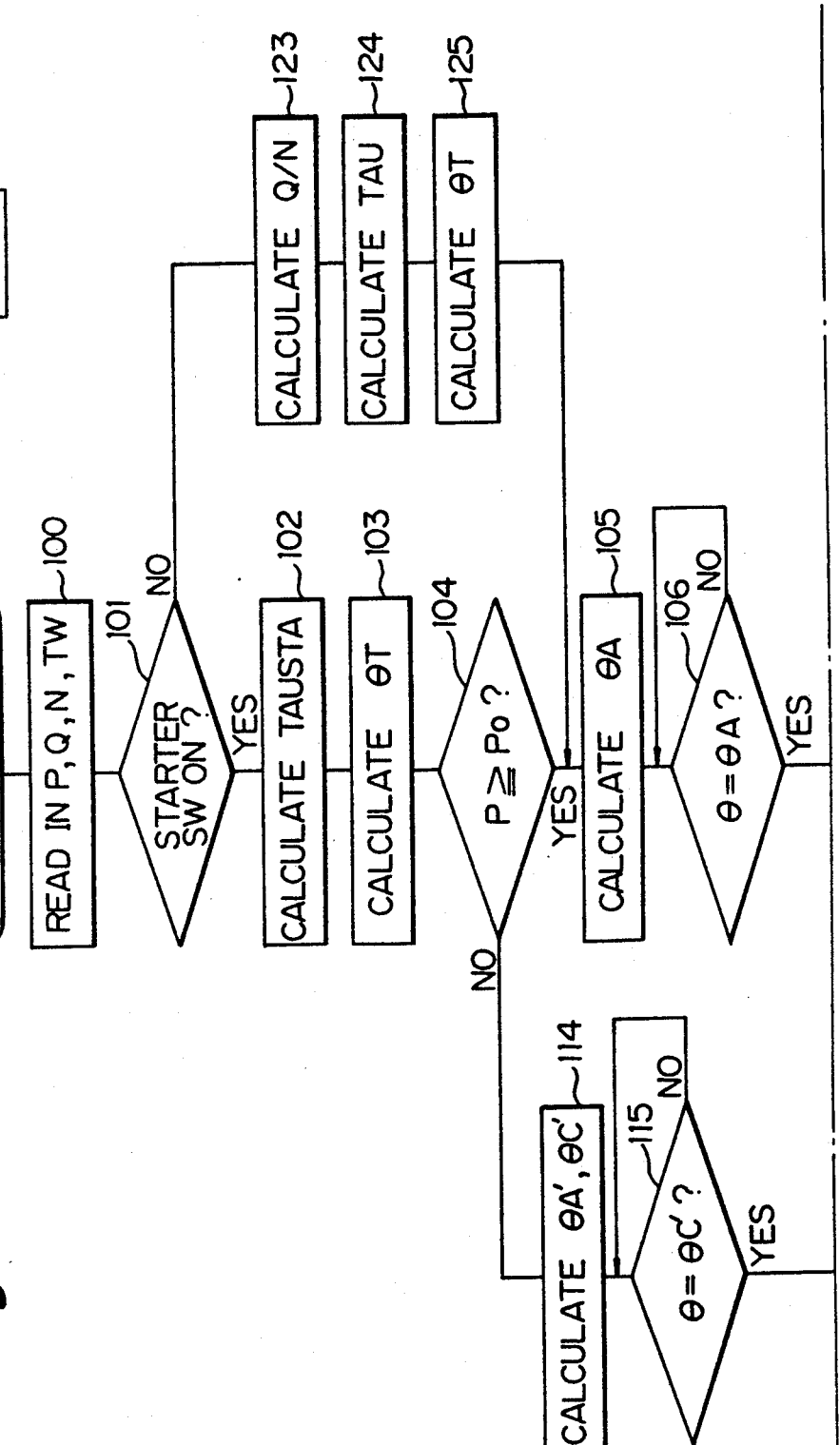

FUEL INJECTION CONTROL APPARATUS OF TWO-STROKE ENGINE

BACKGROUND OF THE INVENTION

1. Field of the Invention

The present invention relates to a fuel injection control apparatus of a two-stroke engine.

2. Description of the Related Art

Known in the art is an air blast valve which injects fuel by compressed air ejected from an engine-driven air pump. When such an engine-driven air pump is used, however, the compressed air pressure does not rise immediately with the startup of the engine and therefore there is the problem that it is not possible to inject fuel by compressed air from the air blast valve immediately upon engine startup and thus time is required for such engine startup.

Therefore, there is known a fuel injection apparatus which is provided with a compressed air tank for storing compressed air discharged from the air pump and which uses the compressed air stored in the compressed air tank at the time of engine startup so as to inject fuel from the air blast valve (see Japanese Unexamined Patent Publication (Kokai) No. 61-112772).

If such a compressed air tank is provided, however, not only is a control valve required to control the storage of the compressed air in the compressed air tank, but also if left standing for a long period, the compressed air in the compressed air tank will gradually leak out and the compressed air pressure will fall, so time is again required for startup of the engine.

SUMMARY OF THE INVENTION

An object of the present invention is to provide a fuel injection control apparatus which enables easy startup of an engine even when the compressed air pressure has fallen.

According to the present invention, there is provided a fuel injection control apparatus of a two-stroke engine comprising: an air pump driven by an engine; an air blast valve provided with a nozzle opening connected to the air pump through a compressed air passage, a fuel injector for injecting fuel into the compressed air passage, and an opening and closing valve for controlling the opening and closing of the nozzle opening; judgement means for judging if the compressed air pressure in the compressed air passage is more than a predetermined set pressure; and control means for controlling the fuel injector and the opening and closing valve to inject fuel from the fuel injector during the opening of the opening and closing valve and cause the injected fuel to be ejected from the nozzle opening by inertia force when the compressed air pressure is less than the set pressure and to inject fuel from the fuel injection valve during the closing of the opening and closing valve and cause the injected fuel to be ejected from the nozzle opening by compressed air during the opening of the opening and closing valve when the compressed air pressure is higher than the set pressure.

The present invention may be more fully understood from the description of preferred embodiments of the invention set forth below, together with the accompanying drawings.

BRIEF DESCRIPTION OF THE DRAWINGS

In the drawings,

FIGS. 5, 5A and 5B are flow charts for the fuel-air injection control.

DESCRIPTION OF THE PREFERRED EMBODIMENTS

Figure 1:
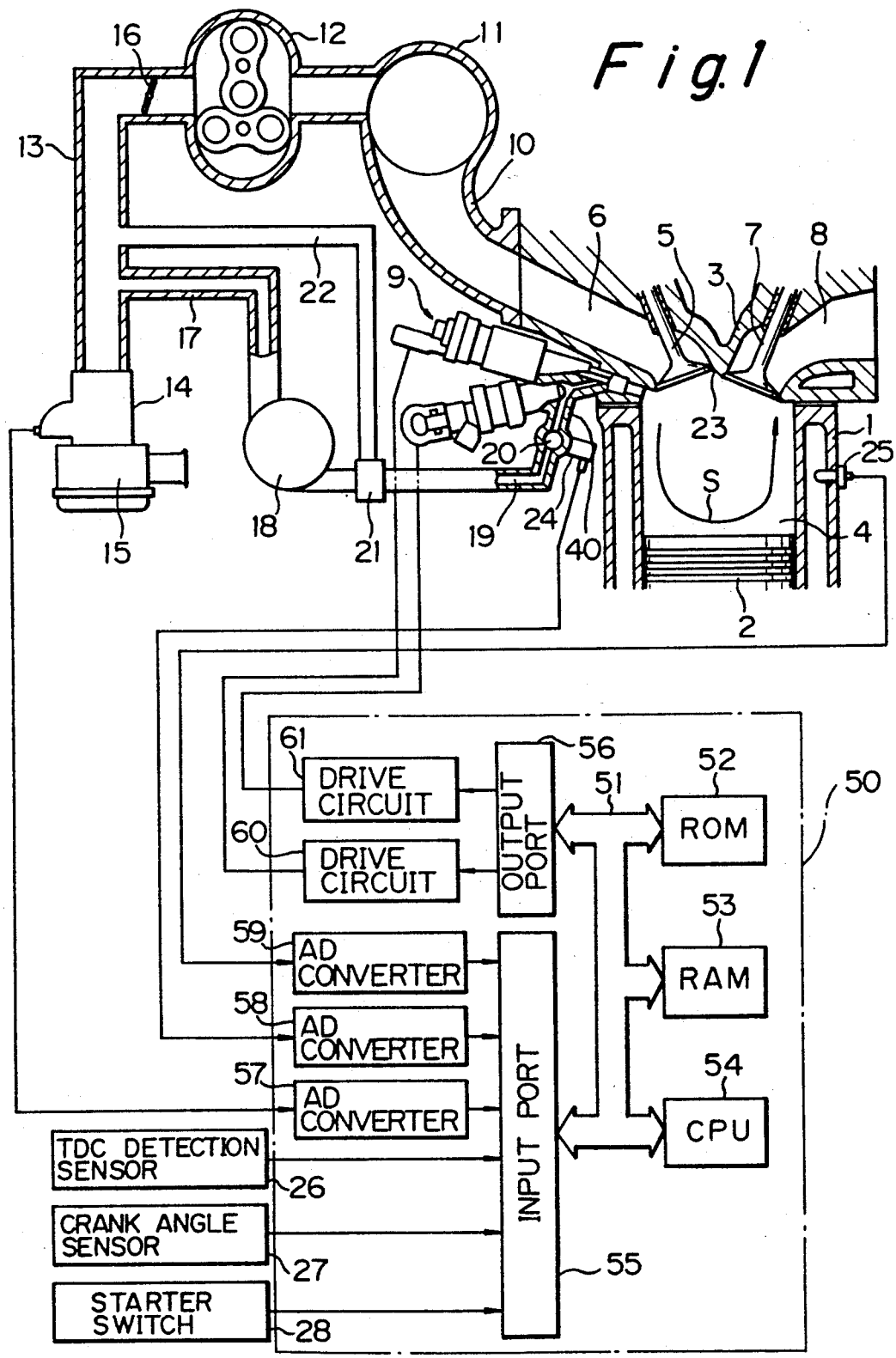
FIG. 1 is an overview of a two-stroke internal combustion engine.

FIG. 1 is an overview of a two-stroke internal combustion engine. Referring to FIG. 1, 1 is a cylinder block, 2 is a piston which moves reciprocally in the cylinder block 1, 3 is a cylinder head which is secured on top of the cylinder block 1, 4 is a combustion chamber formed between the piston 2 and the cylinder head 4, 5 is an intake valve, 6 is an intake port, 7 is an exhaust valve, 8 is an exhaust port, and 9 is an air blast valve for supplying fuel inside the combustion chamber 4. While not shown in the figure, a spark plug is disposed at the center of the inner wall of the cylinder head 3. The intake port 6 is connected to a surge tank 11 through an intake branch pipe, which surge tank 11 is connected through an engine-driven mechanical supercharger 12, intake duct 13, and air flow meter 14 to an air cleaner 15. In the intake duct 13 is disposed a throttle valve 16.

Figure 2:
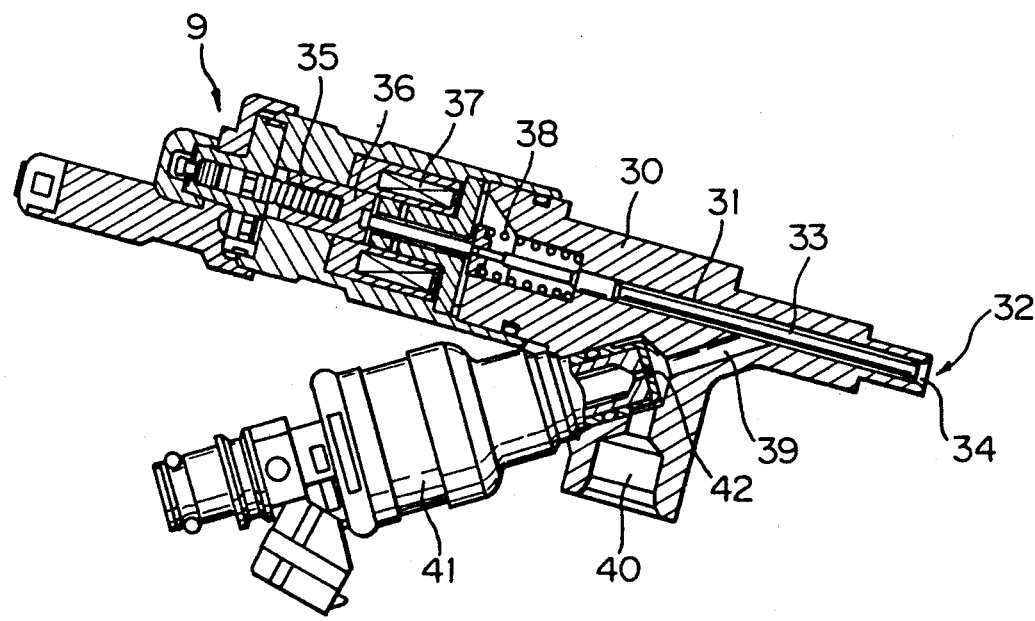
FIG. 2 is an enlarged lateral sectional view of an air blast valve.

FIG. 2 is an enlarged sectional view of the air blast valve 9. Referring to FIG. 2, in a housing 30 of the air blast valve 9 is formed a compressed air passage 31 extending straight, at the front end of the compressed air passage 31 being formed a nozzle opening 32 positioned inside the combustion chamber 4 (FIG. 1). In the compressed air passage 31 is further disposed an opening and closing valve 33, at the outer end of the opening and closing valve 33 being integrally formed a valve body 34 for controlling the opening and closing of the nozzle opening 32. In the housing 30 are disposed a movable core 36 which is disposed coaxially with the opening and closing valve 33 and is biased toward the opening and closing valve 33 by a compression spring 35 and a solenoid 37 for attracting the movable core 36. The inner end of the opening and closing valve 33 is made to abut against an end face of the movable core 36 by a compression spring 38, the spring force of the compression spring 38 being stronger than the spring force of the compression spring 35, so normally the nozzle opening 32 is closed by the valve body 34 of the opening and closing valve 33. When the solenoid 37 is energized, the movable core 36 moves in the direction of the opening and closing valve 33 and as a result the valve body 34 of the opening and closing valve 33 opens the nozzle opening 32. On the other hand, a compressed air passage 39 extending at an angle from the compressed air passage 31 is branched from the compressed air passage 31, which compressed air passage 39 is connected to a compressed air supply port 40. To the housing 30 is attached a fuel injector 41, from a nozzle opening 42 of the fuel injector 41 is injected fuel toward the inside of the compressed air passage 39.

As shown in FIG. 1, an air blast air passage 17 is branched from the intake duct 13 between the air flow meter 14 and throttle valve 16, which air blast air passage 17 is connected to a compressed air distribution chamber 20 through an engine-driven air pump, for example, a vane pump 18 and the compressed air passage 19. This compressed air distribution chamber 20 is connected to the compressed air supply ports 40 of the air blast valves 9 provided for the cylinders. In the compressed air passage 19 is disposed a pressure regulating valve 21 for maintaining the compressed air pressure in the compressed air distribution chamber 20 at a fixed pressure determined in advance. The excess compressed air is returned through a compressed air return passage 22 to the intake duct 13. Therefore, the compressed air passages 31 and 39 of the air blast valve 9 are filled by compressed air of a fixed pressure.

FIG. 3 shows the valve opening timing FO, valve closing timing FC, and valve opening period of the intake valve 5 and the valve opening timing EO, valve closing timing EC, and valve opening period of the exhaust valve 8. As shown in FIG. 3, in the embodiment shown in FIG. 1, the exhaust valve 8 is opened earlier than the intake valve 5 and closed earlier too.

On the other hand, as shown in FIG. 1, a mask wall 23 covering the opening of the intake valve 5 on the exhaust valve 7 side over the entire valve opening period of the intake valve 5 is formed on the inner wall surface of the cylinder head 3. Therefore, when the intake valve 5 opens, fresh air is supplied from the intake port 6 through the opening of the intake valve 5 on the side opposite to the exhaust valve 7 to the inside of the combustion chamber 4. As a result, fresh air flows along the peripheral wall surface of the combustion chamber 4 as shown by the arrow S and in this way excellent loop scavenging is performed.

As shown in FIG. 1, the air blast valve 9 is controlled based on output signals of an electronic control unit 50. The electronic control unit 50 is provided with a ROM (read only memory) 52, RAM (random access memory) 53, CPU (microprocessor) 54, input port 55, and output port 56 mutually connected by a bidirectional bus 51. The air flow meter 14 generates output voltage proportional to the amount of the intake air, which output voltage is input through an AD converter 57 to an input port 55. In the compressed air distribution chamber 20 is mounted a pressure sensor 24 which generates an output voltage proportional to a compressed air pressure P, which output voltage of the pressure sensor 24 is input through an AD converter 58 to an input port 55. Further, in the cylinder block 1 is mounted a water temperature sensor 25 which generates an output voltage proportional to the cooling water temperature of the engine. The output voltage of the water temperature sensor 25 is input through an AD converter 59 to the input port 55. The TDC detection sensor 26 generates an output pulse every 180 degree crank angle, the crank angle sensor 27 generates an output pulse every 30 degree crank angle, and the output pulses of the TDC detection sensor 26 and crank angle sensor 27 are input to the input port 55. In the electronic control unit 50, the current crank angle is calculated from the output pulses of the TDC detection sensor 26 and crank angle sensor 27, and the engine rotational speed is calculated from the output pulses of the crank angle sensor 27. The starter switch 28 is turned on when the starter motor is driven, and a signal showing that the starter switch 28 is on is input to the input port 55. On the other hand, the output port 56 is connected to a solenoid 37 of the air blast valve 9 and the fuel injector 41 through corresponding drive circuits 60 and 61.

Figure 3A:
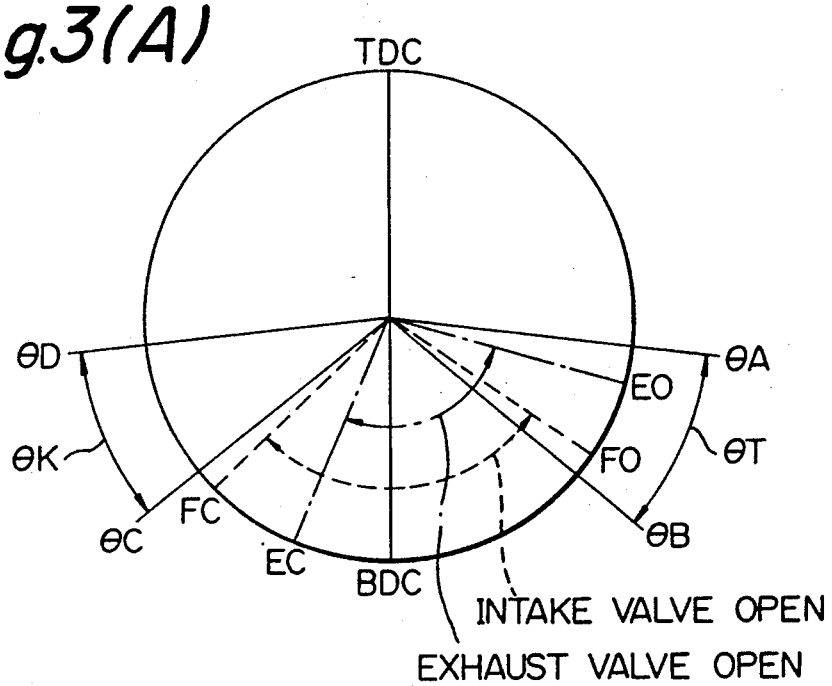
FIGS. 3A and 3B are graphs showing the valve opening period of intake and exhaust valves and the valve opening period of an opening and closing valve.

FIG. 3(A) shows that the compressed air pressure P detected by the pressure sensor 24, that is, the pressure P of the compressed air supplied to the air blast valve 9, is higher than the set pressure P0 determined in advance. Note that in FIG. 3(A), $\theta A$ shows the timing of the start of the fuel injection from the fuel injector 41, $\theta B$ shows the timing of the completion of the fuel injection, and $\theta T$ shows the injection period. Further, $\theta C$ shows the opening timing of the opening and closing valve 33, $\theta D$ shows the closing timing of the opening and closing valve 33, and $\theta K$ shows the opening period of the opening and closing valve 33.

As shown in FIG. 3(A), when the compressed air pressure P supplied to the air blast valve 9 is above the set pressure P0 and around when the intake valve 5 and exhaust valve 7 start to open, fuel is injected from the fuel injector 41, and after the exhaust valve 7 closes, the opening and closing valve 33 is opened. That is, after fuel is injected from the fuel injector 41, the opening and closing valve 33 is opened.

If the pressure P of the compressed air supplied to the air blast valve 9 is higher than the set pressure P0, when the opening and closing valve 33 closes, compressed air of over the set pressure P0 is filled in the compressed air passages 31 and 39. Therefore, fuel is injected from the fuel injector 41 to the inside of the compressed air passages 31 and 39 filled with the compressed air. The injected fuel is gradually vaporized and heads to the valve body 34. Next, when the opening and closing valve 33 opens, injected fuel is injected together with the compressed air from the nozzle opening 32 into the combustion chamber 4. The injected fuel undergoes vaporization until the opening and closing valve 33 opens. When the opening and closing valve 33 opens, the fuel is finely particulated by the compressed air which is injected, so the injected fuel from the air blast valve 9 is fully atomized.

Note that in the example shown in FIG. 3(A), the fuel injection completion timing $\theta B$ is fixed and therefore by changing the fuel injection starting timing $\theta A$ the fuel injection period $\theta T$ can be changed. On the other hand, the valve opening timing $\theta C$ and the valve closing timing $\theta D$ of the opening and closing valve 33 are fixed.

Figure 3B:
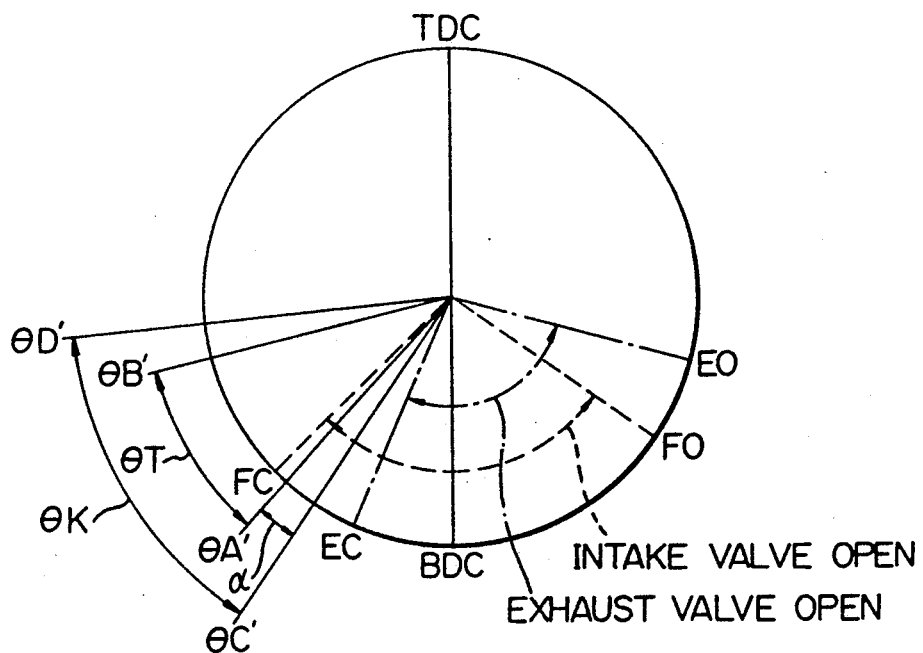

FIG. 3(B) shows the case when the compressed air pressure P detected by the pressure sensor 24, that is, the pressure P of the compressed air supplied to the air blast valve 9, is lower than a predetermined set pressure P0. Note that in FIG. 3(B), $\theta A'$ shows the fuel injection starting timing from the fuel injector 41, $\theta B'$ shows the fuel injection completion timing, and $\theta T$ shows the injection period. Further, $\theta C'$ shows the valve opening timing of the opening and closing valve 33, $\theta D'$ shows the valve closing timing of the opening and closing valve 33, and $\theta K$ shows the valve opening period of the opening and closing valve 33.

As shown in FIG. 3(B), even when the pressure of the compressed air supplied to the air blast valve 9 is lower than the set pressure P0, the opening and closing valve 33 is opened after the exhaust valve 7 closes, but fuel is injected from the fuel injector 41 during the period $\theta K$ when the opening and closing valve 33 is opened. In this way, when the compressed air pressure P0 is lower than the set pressure P, even if the opening and closing valve 33 opens, the compressed air will not flow out from the nozzle opening 32 much at all. On the other hand, fuel injected from the fuel injector 41 advances in the compressed air passage 39, then in the compressed air passage 31 toward the valve body 34. At this time, the opening and closing valve 34 is opened, so the injected fuel continues to advance due to the inertia force and is ejected from the nozzle opening 32 into the combustion chamber 4. That is, if the opening and closing valve 33 opens when fuel is injected from the fuel injector 41, the injected fuel is ejected from the nozzle opening 32 to the combustion chamber 4 by the inertia force of the time of fuel injection. Therefore, even if the pressure P of the compressed air supplied to the air blast valve 20 is low, the injected fuel is supplied from the nozzle opening 32 to the inside of the combustion chamber 4.

Note that in the example shown in FIG. 3(B), the fuel injection completion timing $\theta B'$ is fixed, therefore by changing the fuel injection starting timing $\theta A'$, it is possible to change the fuel injection period $\theta T$. Further, the valve closing timing $\theta D'$ of the opening and closing valve 33 is fixed at a somewhat later timing than the fuel injection completion timing $\theta B'$, and the valve opening timing $\theta C'$ of the opening and closing valve 33 is set to a timing exactly a crank angle $\alpha$ earlier than the fuel injection starting timing $\theta A'$.

Figure 4:
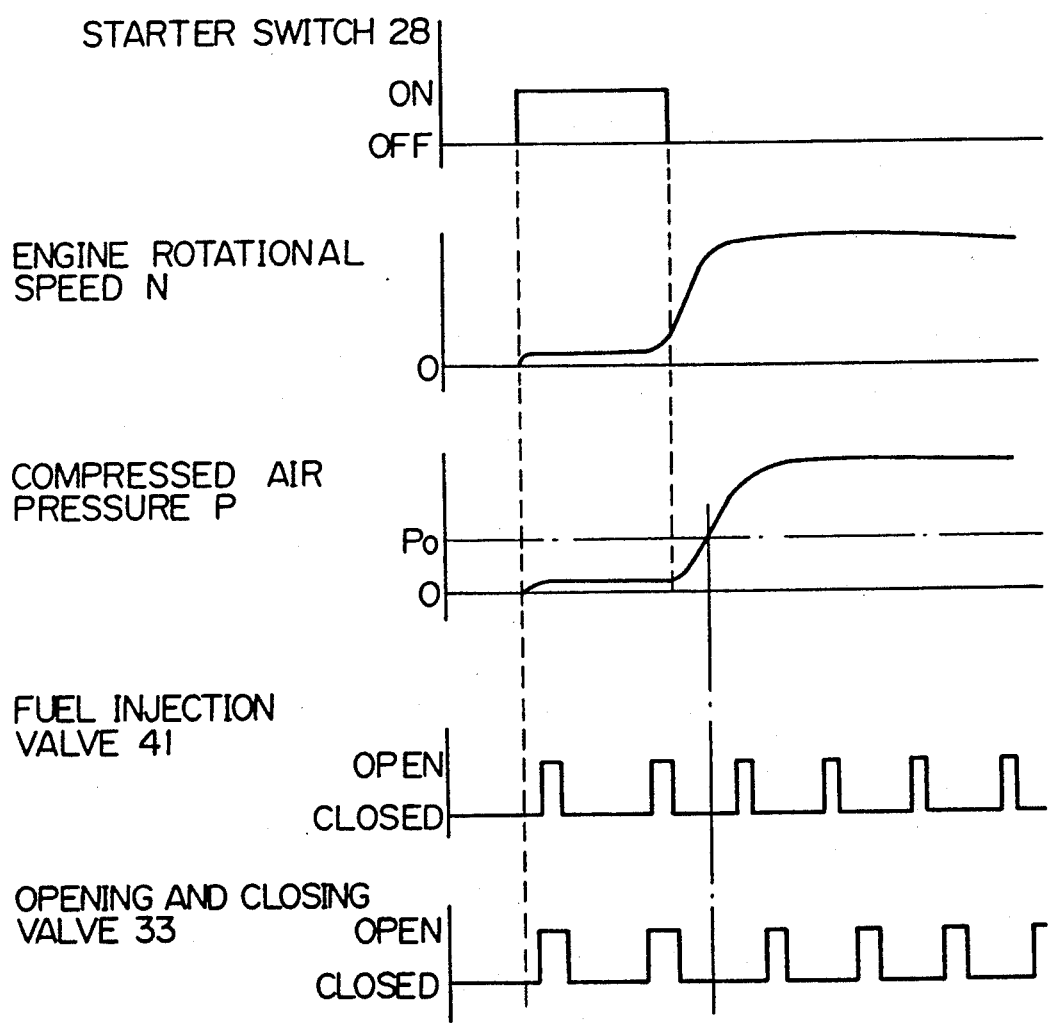
FIG. 4 is a time chart.

FIG. 4 shows the case where an engine is restarted from a state where the compressed air pressure P in the compressed air distribution chamber 20 falls to substantially atmospheric pressure after the stopping of the engine. In this case, as shown in FIG. 4, when the starter switch 28 is turned on, the cranking is started, so the engine rotational speed N rises somewhat and, further, the drive of the vane pump 18 is started, so the compressed air pressure P in the compressed air distribution chamber 20 rises somewhat. However, at this time, the compressed air pressure P is lower than the set pressure P0, therefore as shown in FIG. 3(B), fuel is injected from the fuel injector 41 during the period of opening of the opening and closing valve 33. The injected fuel is injected from the nozzle opening 32 by the inertia force as mentioned above and therefore the engine immediately is started.

On the other hand, when the engine begins operating on its own, the engine rotational speed rises suddenly and the compressed air pressure P also rises rapidly. Next, when the compressed air pressure P becomes higher than the set pressure P0, as shown in FIG. 3(A), fuel is injected from the fuel injector 41, then the opening and closing valve 33 is opened.

Figure 5B:
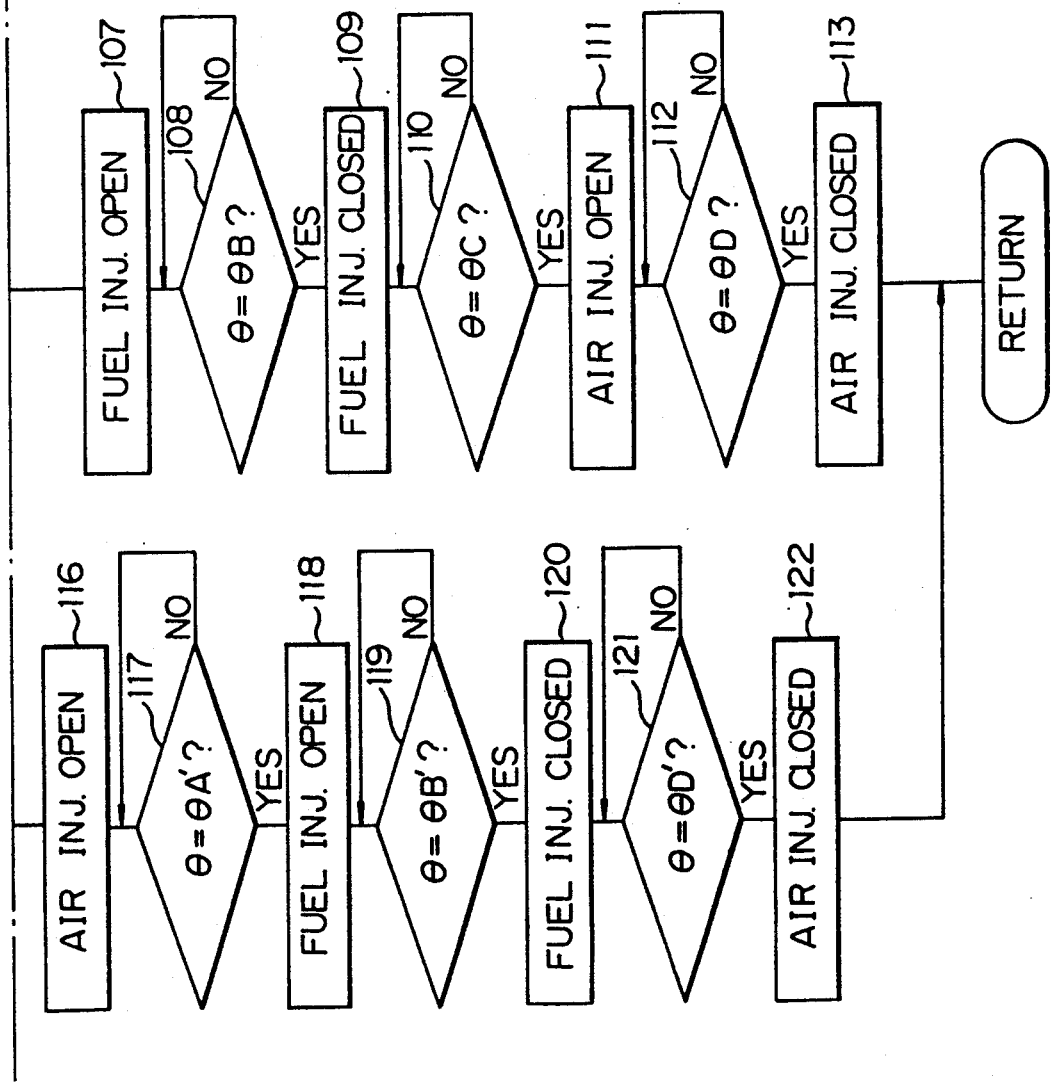

FIG. 5 shows the routine for execution of the fuel-air injection control.

Referring to FIG. 5, first, at step 100, the output signal of the pressure sensor 24 showing the compressed air pressure P, the output signal of the air flow meter 14 showing the amount of intake air Q, the engine rotational speed N calculated from the output signal of the crank angle sensor 27, and the output signal of the water temperature sensor 25 showing the engine cooling water temperature TW are read. Next, at step 101, it is judged if the starter switch 28 is on or not. When the starter switch 28 is on, the control proceeds to step 102, where the fuel injection period TAUSTA of the start is calculated based on the engine cooling water temperature TW. Next, at step 103, the fuel injection period $\theta T$ (FIG. 3) corresponding to the fuel injection period TAUSTA is calculated from the engine rotational speed N. Next, at step 104, it is judged if the compressed air pressure P is higher than the set pressure P0. When the engine starts again directly after the engine stops, the compressed air pressure P in the compressed air distribution chamber 20 is relatively high and $P \geq P0$. Therefore, at this time, the control proceeds to step 105 and, as shown in FIG. 3(A), the fuel-air injection timing is calculated.

That is, at step 105, the fuel injection starting timing $\theta A$ is calculated from the fuel injection period $\theta T$. Next, at step 106, it is waited until the crank angle $\theta$ becomes the fuel injection starting timing $\theta A$ and when $\theta = \theta A$, the control proceeds to step 107, where the fuel injection is started from the fuel injector 41. Next, at step 108, it is waited until the crank angle becomes the fuel injection completion timing $\theta B$ and when $\theta = \theta B$, the control proceeds to step 108, where the fuel injection from the fuel injector 41 is stopped. Next, at step 110, it is waited until the crank angle $\theta$ becomes the opening timing $\theta C$ of the opening and closing valve 33 and when $\theta = \theta C$, the control proceeds to step 111, where the opening and closing valve 33 is opened. Next, at step 112, it is waited until the crank angle $\theta$ becomes the closing timing $\theta D$ of the opening and closing valve 33 and when $\theta = \theta D'$, the control proceeds to step 113, where the opening and closing valve 33 is closed. Next, the control returns to step 100.

On the other hand, when the starter switch 28 is turned on and the compressed air pressure P is lower than the set pressure P0, the control proceeds to step 104, where, as shown in FIG. 3(B), the fuel-air injection timing is calculated.

That is, at step 114, the fuel injection starting timing $\theta A'$ is calculated from the fuel injection period $\theta T$, and the opening timing $\theta C'$ of the opening and closing valve 33 is calculated by subtracting the fixed crank angle $\alpha$ from the fuel injection starting timing $\theta A'$. Next, at step 115, it is waited until the crank angle $\theta$ becomes the opening timing $\theta C'$ of the opening and closing valve 33 and when $\theta = \theta C'$, the control proceeds to step 116, where the opening and closing valve 33 is opened. Next, at step 117, it is waited until the crank angle $\theta$ becomes the fuel injection starting timing $\theta A'$ and when $\theta = \theta A'$, the control proceeds to step 118, where the fuel injection from the fuel injector 41 is started. Next, at step 119, it is waited until the crank angle $\theta$ becomes the fuel injection completion timing $\theta B'$ and when $\theta = \theta B'$, the control proceeds to step 120, where the fuel injection from the fuel injector 41 is stopped. Next, at step 121, it is waited until the crank angle $\theta$ becomes the opening timing $\theta D'$ of the opening and closing valve 33 and when $\theta = \theta D'$, the control proceeds to step 122, where the opening and closing valve 33 is closed.

On the other hand, when the starter switch 28 is turned off, the control proceeds from step 101 to step 123, where the engine load Q/N (amount of intake air Q/engine rotational speed N) is calculated, then at step 124 the fuel injection period TAU is calculated from the engine load Q/N and the engine rotational speed N. Next, at step 125, the fuel injection period $\theta T$ corresponding to the fuel injection period TAU is calculated from the engine rotational speed N, then the control proceeds to step 105, where the fuel injection timing is calculated, as shown in FIG. 3(A).

For the judgement as to if the compressed air pressure P has become more than the set pressure P0, it is most reliable to use the pressure sensor 24. However, if the engine rotational speed N rises during engine startup, the compressed air pressure P also rises, so when the engine rotational speed N becomes higher than a predetermined speed N0, it is judged that the compressed air pressure P becomes higher than the set pressure P0.

Further, as shown in FIG. 3(A) and (B), irregardless of whether the compressed air pressure P is higher than the set pressure P0, the valve opening timing of the opening and closing valve 33 is substantially the same and therefore the timing of supply of fuel from the nozzle opening 32 to the combustion chamber 4 is substantially the same. Therefore, the engine continues to operate smoothly even if the compressed air pressure P falls due to some factor or another after the engine startup. Further, in the example shown in FIG. 3(A) and (B), the opening timing θK of the opening and closing valve 33 is later than the closing timing EC of the exhaust valve 7, therefore fuel injected from the nozzle opening 32 never blows through to the inside of the exhaust port 8. Therefore, after the engine starts operating on its own, of course, and also during engine startup, even if the compressed air pressure P falls due to some sort of reason after the engine begins to operate on its own again, fuel will never blow through to the inside of the exhaust port 8.

According to the present invention, it is possible to supply fuel even when the compressed air pressure falls without use of a tank for storing compressed air or a separate fuel injector such as a cold start injector.

While the invention has been described by reference to specific embodiments chosen for purposes of illustration, it should be apparent that numerous modifications could be made thereto by those skilled in the art without departing from the basic concept and scope of the invention.

We claim:

1. A fuel injection control apparatus of a twostroke engine comprising:
   an air pump driven by the engine;
   an air blast valve provided with a nozzle opening connected to said air pump through a compressed air passage, a fuel injector for injecting fuel into said compressed air passage, and an opening and closing valve for controlling the opening and closing of the nozzle opening;
   judgement means for judging if the compressed air pressure in said compressed air passage is more than a predetermined set pressure; and
   control means for controlling said fuel injector and said opening and closing valve to inject fuel from said fuel injector during the opening of the opening and closing valve and cause the injected fuel to be ejected from said nozzle opening by inertia force when the said compressed air pressure is less than said set pressure and to inject fuel from said fuel injector during the closing of the opening and closing valve and cause the injected fuel to be ejected from said nozzle opening by compressed air during the opening of the opening and closing valve when the compressed air pressure is higher than said set pressure.

2. A fuel injection control apparatus as set forth in claim 1, wherein said opening and closing valve is opened after completion of a scavenging stroke.

3. A fuel injection control apparatus as set forth in claim 2, which is provided with an intake valve and exhaust valve and wherein said opening and closing valve opens after the closing of said exhaust valve.

4. A fuel injection control apparatus as set forth in claim 3, wherein said exhaust valve opens earlier than said intake valve and said exhaust valve closes earlier than said intake valve.

5. A fuel injection control apparatus as set forth in claim 2, which is provided with means for calculating the period of fuel injection from the fuel injector and wherein when said compressed air pressure is lower than said set pressure, the crank angle of completion of the fuel injection from the said fuel injector is fixed and the crank angle of the start of the fuel injection from said fuel injector is determined based on the said fuel injection period.

6. A fuel injection control apparatus as set forth in claim 5, wherein when the said compressed air pressure is lower than said set pressure, the valve closing timing of the said opening and closing valve is fixed to a crank angle later than the timing of completion of the fuel injection from said fuel injector, and the valve opening timing of the said opening and closing valve is set to a crank angle earlier than the timing of start of fuel injection from said fuel injector by a predetermined crank angle.

7. A fuel injection control apparatus as set forth in claim 5, which is provided with means for judging if the starter switch is on and wherein when the starter switch is on, the fuel injection period is set in accordance with the engine temperature.

8. A fuel injection control apparatus as set forth in claim 2, wherein when said compressed air pressure is above said set pressure, both the crank angle where the opening and closing valve opens and the crank angle where the opening and closing valve closes are fixed.

9. A fuel injection control apparatus as set forth in claim 2, wherein when said compressed air pressure is above said set pressure, the timing of fuel injection from said fuel injector is set before the completion of the scavenging stroke.

10. A fuel injection control apparatus as set forth in claim 9, which is provided with means for calculating the timing of fuel injection from the fuel injector and wherein the crank angle of completion of fuel injection from said fuel injector is fixed and the crank angle of the start of the fuel injection from said fuel injector is determined based on the said fuel injection period.

11. A fuel injection control apparatus as set forth in claim 10, which is provided with means for judging if the starter switch is on and wherein when the starter switch is on, the fuel injection period is set according to the temperature of the engine.

12. A fuel injection control apparatus as set forth in claim 1, wherein said judgement means is provided with a pressure sensor for detecting the compressed air pressure in said compressed air passage.

13. A fuel injection control apparatus as set forth in claim 1, wherein said judgement means judges that the compressed air pressure in said compressed air passage is above said set pressure when the engine rotational speed is above a predetermined rotational speed.

14. A fuel injection control apparatus as set forth in claim 1, wherein fuel is injected from said fuel injector toward the direction of flow of the compressed air.

15. A fuel injection control apparatus as set forth in claim 14, wherein said compressed air passage is comprised of a first passage portion extending straight toward said nozzle opening and a second passage portion extending straight in an angle from said first passage portion toward a direction away from said nozzle opening and wherein fuel is injected in said second passage portion along an axial line of said second passage portion from said fuel injector.

16. A fuel injection control apparatus as set forth in claim 1, wherein said nozzle opening is disposed in the combustion chamber.

* * * * *